United States Patent
Kallarackal et al.

(10) Patent No.: US 11,268,592 B2
(45) Date of Patent: Mar. 8, 2022

(54) AUTOMATIC CONTROL PANEL FOR VULCANIZING PRESS AND METHOD OF USING THEREOF

(71) Applicant: THEJO ENGINEERING LIMITED, Chennai (IN)

(72) Inventors: Manoj Joseph Kallarackal, Chennai (IN); Jaimon Jacob, Chennai (IN); Manimaran Elumalai, Chennai (IN); Sabu Mathew, Chennai (IN)

(73) Assignee: Thejo Engineering Limited, Chennai (IN)

( * ) Notice: Subject to any disclaimer, the term of this patent is extended or adjusted under 35 U.S.C. 154(b) by 0 days.

(21) Appl. No.: 16/643,539

(22) PCT Filed: Aug. 29, 2018

(86) PCT No.: PCT/IN2018/050553
§ 371 (c)(1),
(2) Date: Feb. 29, 2020

(87) PCT Pub. No.: WO2019/043725
PCT Pub. Date: Mar. 7, 2019

(65) Prior Publication Data
US 2020/0400213 A1    Dec. 24, 2020

(30) Foreign Application Priority Data

Aug. 30, 2017   (IN) .............................. 201741030663

(51) Int. Cl.
*F16G 3/10*     (2006.01)
*B29C 35/02*    (2006.01)
(Continued)

(52) U.S. Cl.
CPC ................ *F16G 3/10* (2013.01); *B29C 35/02* (2013.01); *B29C 66/91421* (2013.01);
(Continued)

(58) Field of Classification Search
CPC ....... F16G 3/003; F16G 3/10; B29C 66/4324; B29C 66/855; B29C 66/91421;
(Continued)

(56) References Cited

U.S. PATENT DOCUMENTS 3,969,051 A * 7/1976 Hovila .................... B29C 35/02
                                                425/11
4,623,419 A * 11/1986 Price ....................... B29C 66/71
                                                100/211
(Continued)

*Primary Examiner* — Gene O Crawford
*Assistant Examiner* — Keith R Campbell
(74) *Attorney, Agent, or Firm* — Rumit Ranjit Kanakia

(57) ABSTRACT

An automatic control unit for field vulcanizing press is provided. The control unit helps to monitor and control all three essential vulcanizing parameters viz. temperature, pressure and time, either locally or through remote access. Data logging, local monitoring & control of vulcanizing parameters or remote monitoring and control of vulcanizing parameters using a smart device are the major features of this control unit in which remote monitoring and control of vulcanizing parameters is the unique feature of this control unit. A video recording unit is also provided to record entire splicing operation and also there is option for online video streaming facility and it will help to monitor the entire splicing operation from a remote-control station.

12 Claims, 3 Drawing Sheets

(51) Int. Cl.
  *B29C 65/00* (2006.01)
  *B29D 29/06* (2006.01)
  *B29L 31/00* (2006.01)

(52) U.S. Cl.
  CPC ...... *B29C 66/92445* (2013.01); *B29C 66/944* (2013.01); *B29C 66/9674* (2013.01); *B29D 29/06* (2013.01); *B29L 2031/7092* (2013.01)

(58) Field of Classification Search
  CPC ............ B29C 66/92445; B29C 66/944; B29C 66/9674; B29D 29/06; B29L 2031/7092; Y10T 24/1664
  See application file for complete search history.

(56) References Cited

U.S. PATENT DOCUMENTS

| | | | |
|---|---|---|---|
| 6,692,614 B2* | 2/2004 | Wright | F16G 3/16 100/219 |
| 8,662,290 B2* | 3/2014 | Twigger | B65G 43/06 198/810.01 |
| 9,090,022 B1* | 7/2015 | van't Schip | B29C 65/7841 |
| 2017/0159751 A1* | 6/2017 | van't Schip | B29C 66/82421 |
| 2020/0180189 A1* | 6/2020 | Knothe | B29C 33/202 |

* cited by examiner

AUTOMATIC CONTROL PANEL FOR VULCANIZING PRESS AND METHOD OF USING THEREOF

FIELD OF THE INVENTION

The present invention relates to Conveyor belts. More particularly, the invention relates to system and method for splicing of conveyor belts.

BACKGROUND

Conveyor belts are commonly used as a means for transporting materials from one location to another. The belt conveyor systems are used for bulk material handling in core industries like mines, steel plants, power plants, cement plants, aluminium plants, refineries, ports, food and dairy industries etc. In the conveyor system, the belt conveyor is the main and most expensive component.

In large mining operations, the conveyor belt is generally formed of a rubber body embedded with fabric plies, steel cords or strands. A cover compound can be used at the surface wherein the material is to be conveyed. Generally, the compound is abrasion and cut resistant and of sufficient thickness to prevent degradation of the belt when load is being conveyed. Such steel corded or stranded belts may extend long distances and cost large amounts to install and fabricate. The fabrication of such belts occurs initially at a factory wherein steel strands or cords are arranged in a coplanar relationship parallel to the surface of the belt so that the belt will exhibit uniform expansion and minimize weaving as it traverses which can cause belt damage. The main types of conveyor belts used are fabric ply belts, steel cord belts & PVC belts. The belt manufacturers supply long belts in reel form, with two distinct ends. The process of splicing is required to make the belts endless on the conveyor structure.

During installation and maintenance of conveyor belts, the ends of one or more conveyor belts must be joined together. While several existing methods and tools are capable of joining belt ends together, such as using adhesive or mechanical fasteners to join the belt ends, vulcanized splicing is often the preferred method of joining the ends of conveyor belts.

As the weakest point of a chain is the link, so also the weakest point in a conveyor belt is the joint, A poor splice can result in an area of the splice that is weaker than the rest of the belt or an area that contains weakened material from overheating/scorching of the material or under cure/incomplete fusion between the materials of the two belt ends. A splice of poor quality may become a weak portion of the belt, prone to subsequent failure. In the existing systems, vulcanizing parameters once configured needs to be monitored continuously to avoid any changes to the main parameters. Thus, close monitoring of the splicing process by dedicated and trained personnel becomes mandatory to avoid any such faults in the splicing process.

In view of the above, there is a need in the art for improved conveyor belt splicing machines with enhanced features.

SUMMARY OF THE INVENTION

According to an embodiment, the present invention provides a conveyor belt splicing system and method. The conveyor belt splicing system includes a plurality of sensors configured for capturing operating parameters, a vulcanizing press configured to heat a spliced area of a conveyor belt and apply pressure using a pressuring unit for joining the spliced area, and a control unit having a processor configured to control the operating parameters for curing the spliced conveyor belt.

In an embodiment the present invention provides a method for conveyor belt splicing including the step of preparing a belt strip, splicing the belt strip by applying splicing material to the prepared belt strip; and hot vulcanizing the spliced belt in a vulcanizing press with controlled operating parameters and curing the belt for joining, wherein the splicing and curing is controlled by a control unit having a processor configured to control the operating parameters for curing the spliced conveyor belt.

DESCRIPTION OF THE INVENTION

Figure 1:
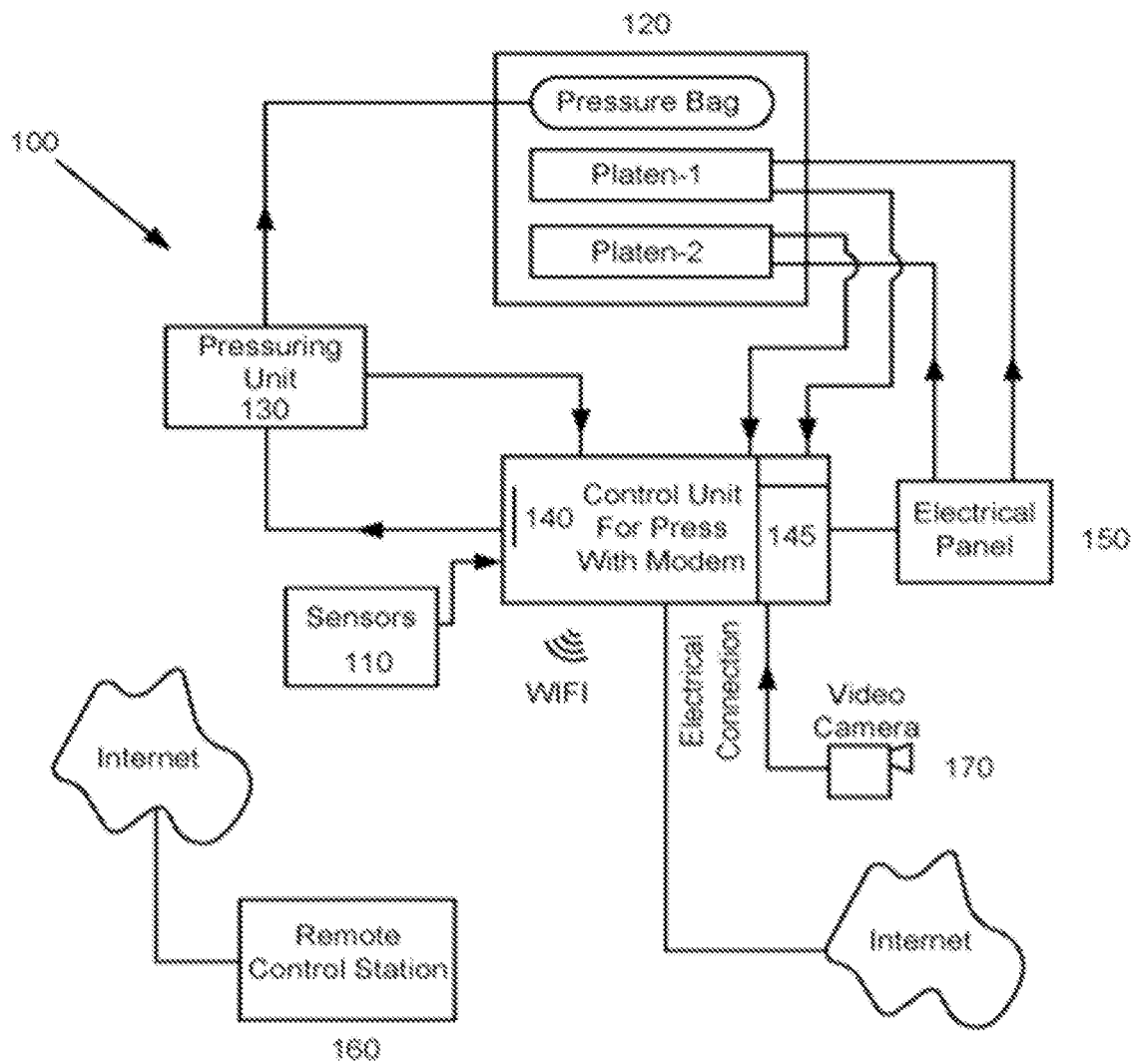
FIG. 1 shows the line diagram of a field vulcanizing press with the control unit in accordance with an embodiment of the present invention.

Various embodiment of the present invention provides a conveyor belt splicing system and method. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "top," "bottom," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on simplistic assembling or manufacturing technologies and/or tolerances. Therefore, example embodiments are not limited to those shown in the views but include modifications in configurations formed on basis of assembling process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to conveyor belt splicing systems and methods.

In an exemplary embodiment, the present embodiment provides a fully automatic splicing system. In an aspect, a camera is provided for live streaming of the entire operation of splicing from the work site to preassigned locations. The recording of the splicing process and the data can be performed through wireless or WiFi or internet or wired connection.

In another aspect, any changes in the process parameters, if required during the splicing process, can be made either locally using the control panel or remotely by authorized personnel through smart devices such as mobile phones or tab or laptop or computer.

In an advantageous aspect of the present invention, it is very easy to monitor and control different splices at different locations simultaneously from a remote station.

According to an embodiment, the present invention provides a conveyor belt splicing system and method.

FIG. 1 shows a conveyor belt splicing system (100) in accordance with an embodiment of the present invention. The conveyor belt splicing system (100) includes a plurality of sensors (110) configured for capturing operating parameters, a vulcanizing press (120) configured to heat a spliced area of a conveyor belt and apply pressure using a pressuring unit (130) for joining the spliced area, and a control unit (140) having a processor (145) configured to control the operating parameters for curing the spliced conveyor belt.

In an embodiment, the pressure is controlled with the control unit (140). The pressuring unit (130) is connected to control unit (140) and pressure parameters are set into the control unit (140) either locally or remotely by authorized personnel.

In an embodiment, the sensors include ambient sensor, humidity sensor etc. connected to the control unit.

In an exemplary embodiment, a hot vulcanizing machine with a fully automatic control unit (140) is provided. The control unit (140) allows control & monitoring of the critical vulcanizing operating parameters i.e. Temperature, pressure and time and allows a user to set the values of each parameter before the splicing operation.

In an embodiment, the splicing is controlled by application of a specific temperature and pressure for a definite time. To perform a perfect splicing operation, temperature, pressure and timing must be controlled precisely. Maintaining the required temperature during the splicing process is very critical as the quality of the splice depends on the amount of heat applied to the belt ends and the amount of time the belt ends are exposed to the heat. the temperature achieved during the splicing will not just depend on the power supplied to the heating plates, so fine tuning of the splicing parameters may be required at a later stage. Similarly, the pressure must be high enough to help fuse the belt ends and yet not deform them permanently. Also, the vulcanization of rubber compounds needs to be carefully controlled and monitored to ensure optimum rubber properties for maximum splice life. Curing at a higher than specified temperature or at lower pressure or altering the cure time may jeopardize the possibility of achieving the best quality splice. Temperature controllers and measuring devices on vulcanizing equipment can't be relied upon to provide a dependable assessment of the actual platen temperatures.

In one aspect, the vulcanizing parameters can be set/programmed either locally or remotely so as to achieve a tight control on the bandwidth of each of the process parameters.

In an exemplary embodiment, the control unit (140) is further connected to electrical panel (150), for controlling of the splicing temperature. The desired current is sent to the heater plates depending upon the required temperature set out of the user. Further, the system includes temperature sensor inside heating plates.

In one embodiment, the splicing parameters can also be set by the end user through a remote-control station (160) and communicated to the control unit (140) over internet or any other suitable network.

In an embodiment, the changes in vulcanizing parameters that happen during the ongoing splicing process can be recorded and transmitted live to remote preassigned locations. A video camera (170) is provided for live streaming and recording purpose. The whole splicing operation is recorded, and the report is sent to the user by email over LAN, WAN or Internet. The network is one of the wired or wireless network.

In an embodiment, the control unit (140) is connected to remote control station (160) via LAN, WAN or internet. The network can be a wired or wireless network.

Figure 2:
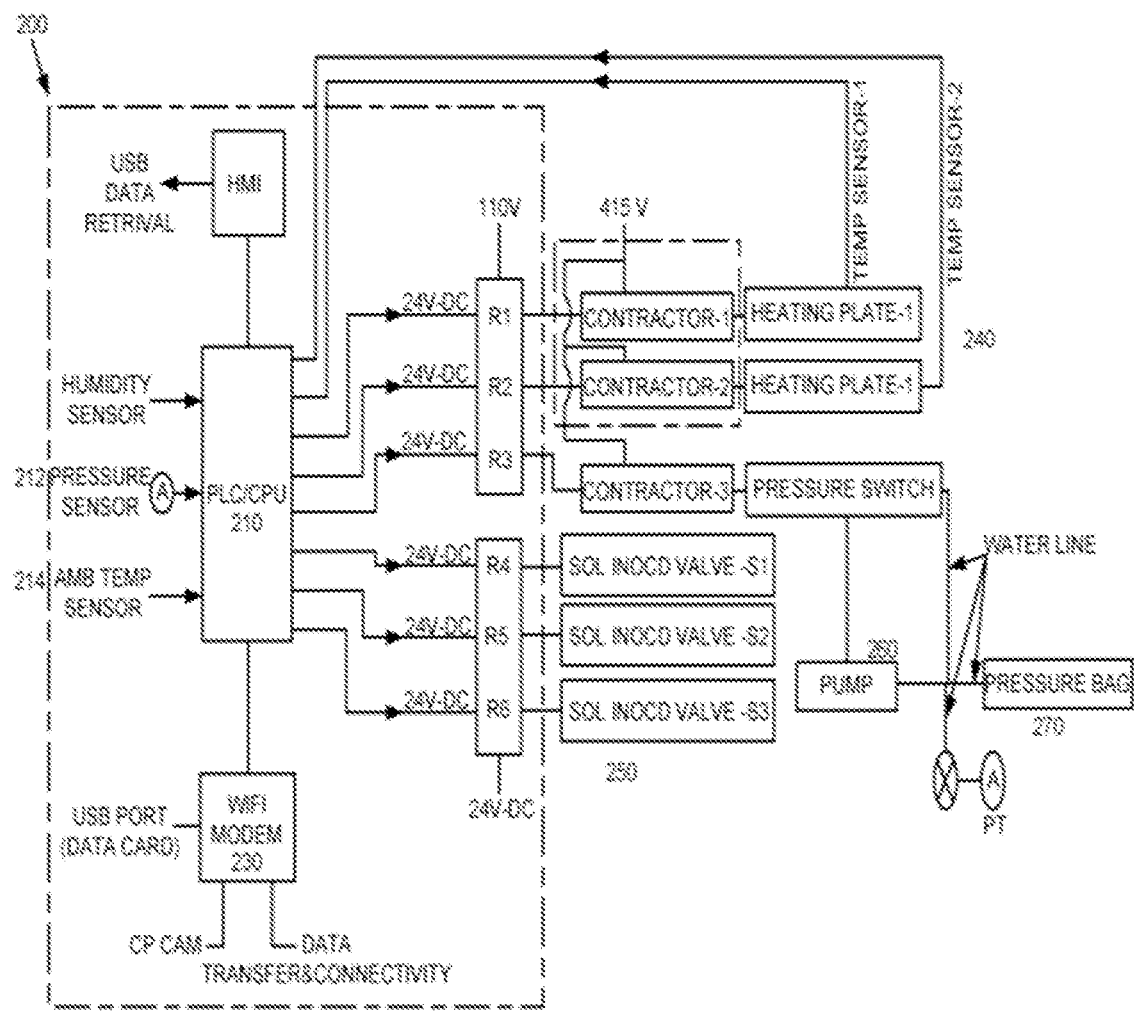
FIG. 2 shows the line diagram of the control unit in accordance with an embodiment of the present invention.

FIG. 2 shows a line diagram (200) of the control unit in accordance with an embodiment of the present invention. The major parts of new control unit are programmable logic controllers (PLC)/Central Processing Unit (CPU) (210), Human Machine Interface (HMI) (220) & WIFI Modem (230). During vulcanization, PLC/CPU unit (210) controls the operation of electrical unit and pressuring unit based on the input data entered through the HMI unit (220) and the feedback from the sensors. Additionally, a humidity sensor (212) and an ambient temperature sensor (214) are provided to record the ambient condition during the process of vulcanization. PLC/CPU (210) controls the heater plates (240), pressuring unit and solenoid valves (250) through the relays.

It shall be apparent and understood to a person skilled in the art that even though the description explains the system and method of the present invention in example embodiments with one set of heater plates, the system can control a plurality of heater plates, pressurizing units, valves and relays etc. within the scope of the present invention.

In an embodiment, based on the temperatures set for the heater plates (240) and the feedback from sensors provided on heater plates (240), the PLC/CPU (210) will control the heaters (240) through relays (R1 & R2). The relay, R3 is provided to control the operation of the pump (260).

The relays R4, R5 & R6 are provided for controlling the operation of solenoid valves S1, S2 & S3.

In an embodiment, the WIFI modem connect the control unit to other local or remote smart devices. All the vulcanizing parameters shall be recorded in the PLC/CPU (210) and a storage device if connected to the HMI. The data recorded in the PLC/CPU can be monitored remotely.

In an exemplary embodiment, an IP camera is provided and connected to the modem for online video streaming, such that it could make remote monitoring of the splicing operation possible.

In an embodiment, the control unit automatically prepares and sends a report to predesignated addresses such as email ids. A local storage of data and video is also available on the control panel. The report includes all the above data, which is recorded on continuous basis as well as other site related information that are essential to trace the execution of the Splicing.

In an embodiment, the remote control and monitoring is performed through devices selected from a group consisting of but not limited to mobile phones, tabs or laptops or other computers.

In an embodiment, the system may be optionally provided with a battery back up to help in the operating the system in case of power outages.

In an embodiment, the system may optionally be provided with control operations of a Power generator which could be turned on to supply power to the vulcanizing equipment in case of any power outages.

In an exemplary embodiment, the splicing parameters are provided. Before starting splicing operation, the user locally enters related vulcanizing parameters through the control unit. After setting up the splicing parameters entire vulcanizing cycle of the splice is controlled by control unit automatically. Alternatively, the related vulcanizing parameters is set remotely by authorized personnel through smart devices such as mobile phones, tabs or laptops or other computers.

In an exemplary embodiment, all the three parameters are controlled from start to end of the cycle, and simultaneously all the vulcanizing parameters are recorded.

In an embodiment the present invention provides a method of the automatic control and remote monitoring of splicing. The method includes the steps of setting key vulcanizing parameters remotely or locally, logging and transmitting data of the readings on real time basis, streaming/recording video of the entire process, modifying the vulcanizing parameters if required during the splicing either locally or remotely, and generating and mailing of tamper proof reports at the end of the complete vulcanizing report.

The various parameters set on the control unit are changed by authorized personnel from remote locations. The controlling avoids the faults in vulcanizing parameters and good splices are ensured which improves the productivity of conveyor system.

In an embodiment, the present invention provides monitoring and control of all vulcanizing parameters with remote monitoring and control of all vulcanizing parameters (temperature, time & pressure). All the vulcanizing parameters are cross checked from a remote-control place and modified, if there is any mistake in the parameters. This helps in avoiding failures in hot vulcanizing and down time of conveyor system due to splice failures.

Figure 3:
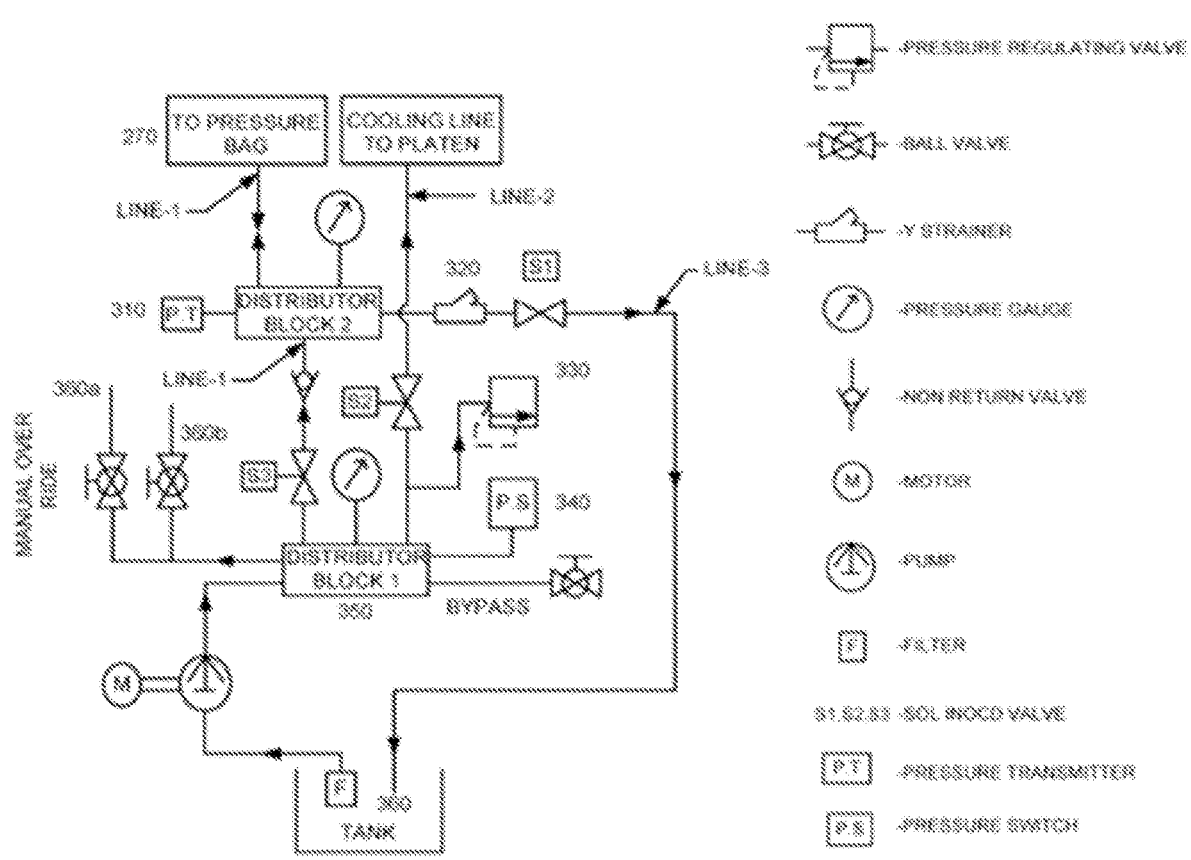
FIG. 3 shows the line diagram of the general hydraulic circuit in accordance with an embodiment of the present invention

FIG. 3, shows the line diagram (300) of the general hydraulic circuit in accordance with an embodiment of the present invention. In hydraulic circuit there are three main lines (Line1, Line2, & Line3).

In an embodiment Line1, is the main pressurizing line for the pressure bag of the vulcanizing press. There is a solenoid valve (S3), a non-return valve and a pressure transmitter (310) connected to this line.

In an embodiment Line2, is the cooling line for the heater platens. There is a solenoid valve (S2) and a pressure regulating valve (330) connected to this line.

In an embodiment Line3, is the water return line and in this line a solenoid valve (S1) and Y-strainer (320) are provided.

In an embodiment, a pressure switch (PS) (340) is provided in the distributor block-1(350) for additional safety. The solenoid valves are normally closed 'NC' type.

Referring to FIGS. 2 & 3, when solenoid valve S3 is energized, the water is pumped in to a pressure bag (270) and during this operation the other two solenoid valves (S1 & S2) will be in closed condition. Solenoid valve S3 is open during the platen heating up period to raise the bag (270) pressure to required level. The pressure transmitter (PT) (310) is provided to sense the line pressure and based on the feedback from the pressure transmitter (PT) (310), the control unit controls the opening and closing operation of (S3). The control unit develops the required vulcanizing pressure gradually in three stages during heat up period.

In another embodiment, the solenoid valve (S2) is energized after completing curing cycle. The operation of solenoid valve (S2) is controlled by the control unit and solenoid valve (S2) allows the water to flow through the cooling lines provided in the heater platens and during this operation, the other two valves (S1 & S3) are in closed condition. The pressure regulating valve (330) is provided in the cooling line to regulate rate of flow of water through the cooling lines.

In one embodiment, the solenoid valve (S1) in the return line gets energized after finishing cooling cycle, when the heater platens temperature reaches the set cooling temperature, the control unit controls the operation of solenoid valve (S1) which allows water from pressure bag which flows to a tank (360) through return line and during this operation, the other two solenoid valves (S2 & S3) remain in closed condition. Solenoid valve (S1) is closed after completely releasing the water from the bag (270).

In an embodiment, two additional ball valves (360a, 360b) are provided on distributor block-1(350) for manual over ride operation.

In an exemplary embodiment, the method of controlling the splicing operation is described as follows. The splicing operation is carried out in the following modes: auto mode, manual control mode, manual override water pump, and manual override electrical.

In the auto mode all the required parameters can be set in to the system via touch screen HMI. The parameters that can be set into the control unit are:
1. Final curing temperature of the Platens
2. Temperature+/−band (temperature variation between top & bottom platen)
3. Final cooling temperature of platens
4. Platen temperature—1 and corresponding set pressure—1
5. Platen temperature—2 and corresponding set pressure—2
6. Platen temperature—3 and corresponding set pressure—3(final curing pressure)
7. Allowable pressure variation range of the pressure bag
8. Curing Time
9. Cycle End time (Extra time to ensure the complete release of water from the pressure bag)

In an embodiment, after inputting all the parameters, auto cycle is initiated by pressing the Auto Cycle Icon. In vulcanizing operation, there are three stages: Heat up stage, Curing stage and Cooling stage.

In heat-up period, temperature and pressure gradually increases and in curing period the temperature and pressure remain constant for specific time period. In cooling period, the heater platens cool down under constant pressure to the set cool platen temperature.

In the auto mode operation, the control unit continuously monitors and controls the three essential parameters viz. temperature, pressure and time. The control unit is automatically switched off after completing the vulcanizing cycle. The major setting for Auto mode are Temperature setting, Pressure Setting & Time setting.

In an embodiment, during the heat-up stage the platen will start heating and when it reaches the first set temperature-1, the pump switches on pumping water into the pressure bag thus increasing the pressure until it reaches the set pressure 1 value. On reaching the set pressure 1 value the switch goes off and stops the pump. The process continues for the next two stages of temperature and pressure setting that has been entered into the control system until the platens and pressure bag reaches the final set temperature and final set pressure.

In an embodiment, once the platen reaches the final curing temperature, the curing cycle starts. On successful completion of the curing cycle time, the platen power supply is switched off and pressure in the bag is maintained.

In an exemplary embodiment, during the cooling stage, the solenoid valve (S2) in the cooling line get energized and allow water to flow through the heater plates. The flow is continued till the platens reach the final cooling temperature of the platen. Then solenoid valve (S2) is closed and solenoid valve (S1) is opened and the bag pressure is released by removing the water and solenoid valve (S1) remains in open condition till the water in the bag gets completely drained.

In an embodiment, during manual control mode the platens are operated individually, the Valve is opened and closed individually, and the pump is also switched on/off individually.

In a related embodiment, manual mode is used for checking the proper functioning of heater plates, pump & solenoid valves.

In an exemplary embodiment, when unexpected situations are encountered, like the control unit is not functioning properly, the pump can be operated manually. The two separate ball valves (360a, 360b) have been provided in the hydraulic circuit and are connected to the pressure bag hose and Platen cooling hose directly. This will help to complete the process without control unit.

In an embodiment, the temperature of platens can be done manually. In that case a selector switch is provided with 4 options (i.e.) 1. Auto, 2. Platen 1—ON, 3. Platen 2—ON, 4. Both platens on.

In an embodiment, while running the electrical unit in Auto Mode the power supply ON/OFF for both the platens is controlled by the PLC/CPU. When the PLC/CPU unit is not functioning properly the mode 2, 3&4 can be used as manual override to complete the process of vulcanizing.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A Conveyor belt splicing system (100) comprises:
   a plurality of sensors (110) configured for capturing operating parameters at a work site;
   a vulcanizing press (120) configured to heat a spliced area of a conveyor belt and apply pressure using a pressuring unit (130) for joining the spliced area; and
   a control unit (140) having a processor (145) configured to control the operating parameters for curing the spliced conveyor belt, wherein the operating parameters are controlled from a remote-preassigned location that simultaneously controls plurality of splices at different locations, and wherein the control unit is operatively coupled with a camera to live stream operation of splicing from the work site to a remote-preassigned location.

2. The system of claim 1 wherein the processor (145) controls operation of an electrical unit (150) and the pressuring unit (130) based on an input data entered through an HMI unit and feedback from the sensors (110).

3. The system of claim 1 wherein the operating parameters include temperature, pressure and time.

4. The system of claim 1 wherein the pressure applied on the splicing area is done by hydraulic circuit.

5. The system of claim 1 wherein the control unit (140) is configured for automatic control of all operating parameters, data logging facility, Local and Remote monitoring and control, and online Video streaming.

6. The system of claim 1 wherein the control unit (140) is configured to set curing process parameters either locally or remotely through WiFi and ensure that the entire curing process is proactively controlled as per the operating parameters including any or a combination of time, pressure, and temperature of a belt joint cure cycle.

7. The system of claim 1 wherein the system (100) is configured to generate and deliver reports of recorded readings of the operating parameters.

8. A method for conveyor belt splicing comprises:
   preparing a belt strip;
   splicing the belt strip by applying splicing material to the prepared belt strip; and
   hot vulcanizing the spliced belt in a vulcanizing press with controlled operating parameters and curing the belt for joining, wherein the splicing and curing is controlled by a control unit having a processor configured to control the operating parameters for curing the spliced conveyor belt, wherein the operating parameters are controlled from a remote-preassigned location that simultaneously controls plurality of splices at different locations, and wherein the control unit is operatively coupled with a camera to live stream operation of splicing from the work site to a remote-preassigned location.

9. The method as claimed in claim 8 wherein operating parameters include temperature, pressure and time.

10. The method of claim 9 wherein the operating parameters are automatically controlled along with data logging facility, Local and Remote monitoring and control, and online Video streaming.

11. The method of claim 10 wherein curing process parameters is set either locally or remotely through WiFi and ensures that the entire curing process is proactively controlled as per the operating parameters including any or a combination of time, pressure, and temperature of a belt joint cure cycle.

12. The method of claim 11 further comprising the step of generating and delivering a report of recorded readings of the operating parameters.

* * * * *